United States Patent
Lin et al.

(10) Patent No.: US 11,683,802 B2
(45) Date of Patent: Jun. 20, 2023

(54) METHOD FOR TRANSMITTING UPLINK CONTROL CHANNEL, NETWORK DEVICE AND TERMINAL DEVICE

(71) Applicant: GUANGDONG OPPO MOBILE TELECOMMUNICATIONS CORP., LTD., Guangdong (CN)

(72) Inventors: Yanan Lin, Guangdong (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/474,544

(22) PCT Filed: Jan. 5, 2017

(86) PCT No.: PCT/CN2017/070328
§ 371 (c)(1),
(2) Date: Jun. 27, 2019

(87) PCT Pub. No.: WO2018/126416
PCT Pub. Date: Jul. 12, 2018

(65) Prior Publication Data
US 2020/0163108 A1    May 21, 2020

(51) Int. Cl.
*H04W 72/21* (2023.01)
*H04W 72/0453* (2023.01)
*H04W 80/08* (2009.01)
*H04W 72/23* (2023.01)
*H04W 72/30* (2023.01)

(52) U.S. Cl.
CPC ....... *H04W 72/21* (2023.01); *H04W 72/0453* (2013.01); *H04W 72/23* (2023.01); *H04W 72/30* (2023.01); *H04W 80/08* (2013.01)

(58) Field of Classification Search
None
See application file for complete search history.

(56) References Cited

U.S. PATENT DOCUMENTS

2009/0181689 A1*  7/2009  Lee .................... H04L 1/1854
                                                        455/450
2012/0213163 A1*  8/2012  Lee .................... H04L 1/1864
                                                        370/329
(Continued)

FOREIGN PATENT DOCUMENTS

AU       2017391791 A1    5/2022
CN         101442818       5/2009
(Continued)

OTHER PUBLICATIONS

EPO, Office Action for EP Application No. 17889573.6, dated Dec. 4, 2019.
(Continued)

*Primary Examiner* — Christopher T Wyllie
(74) *Attorney, Agent, or Firm* — Hodgson Russ LLP

(57) ABSTRACT

Embodiments of the present disclosure provide a terminal device scheduling method, a network device, and a terminal device. The method includes: sending, by a network device, a downlink control channel to a terminal device on a first downlink frequency domain control area, wherein the downlink control channel comprises first configuration information, which is used to dynamically indicate at least one first uplink frequency domain control area used by the terminal device to send an uplink control channel to the network device; and receiving, by the network device, an uplink control channel sent by the terminal device on a first uplink frequency domain scheduling unit of each of the at least one first uplink frequency domain control area, wherein a frequency domain position of the first uplink frequency domain scheduling unit in the first uplink frequency domain control area is determined according to the first downlink frequency domain control area.

20 Claims, 9 Drawing Sheets

(56) References Cited

U.S. PATENT DOCUMENTS

| | | | | |
|---|---|---|---|---|
| 2013/0128857 | A1* | 5/2013 | Nakao | H04W 72/23 |
| | | | | 370/329 |
| 2013/0230030 | A1* | 9/2013 | Papasakellariou | H04L 1/1861 |
| | | | | 370/336 |
| 2013/0242890 | A1* | 9/2013 | He | H04W 76/27 |
| | | | | 370/329 |
| 2014/0036810 | A1* | 2/2014 | Harrison | H04L 5/0051 |
| | | | | 370/329 |
| 2014/0105055 | A1* | 4/2014 | Kang | H04W 72/21 |
| | | | | 370/252 |
| 2014/0105155 | A1 | 4/2014 | Kim et al. | |
| 2014/0192757 | A1* | 7/2014 | Lee | H04L 1/1671 |
| | | | | 370/329 |
| 2015/0092728 | A1* | 4/2015 | Wang | H04L 5/0048 |
| | | | | 370/329 |
| 2015/0139136 | A1* | 5/2015 | Zhang | H04L 5/0053 |
| | | | | 370/329 |
| 2015/0181566 | A1* | 6/2015 | Stopler | H04W 72/21 |
| | | | | 370/329 |
| 2015/0208391 | A1 | 7/2015 | Park | |
| 2016/0105268 | A1 | 4/2016 | Kim et al. | |
| 2016/0270108 | A1 | 9/2016 | Dinan | |
| 2016/0295577 | A1* | 10/2016 | Harrison | H04L 5/0053 |
| 2018/0343650 | A1 | 11/2018 | Zhou | |
| 2019/0069312 | A1* | 2/2019 | Oh | H04L 5/0053 |
| 2019/0110332 | A1* | 4/2019 | Wikström | H04W 72/23 |
| 2020/0213982 | A1* | 7/2020 | Xiong | H04W 72/23 |

FOREIGN PATENT DOCUMENTS

| | | |
|---|---|---|
| CN | 103795516 | 5/2014 |
| CN | 104662978 | 5/2015 |
| CN | 105451155 | 3/2016 |
| CN | 105722229 | 6/2016 |
| JP | 2020520144 | 7/2020 |
| RU | 2588600 | 7/2016 |
| WO | 2014022690 | 2/2014 |
| WO | 2014025150 | 2/2014 |
| WO | 2016155305 | 10/2016 |

OTHER PUBLICATIONS

SIPO, First Office Action for CN Application No. 201780078815.3, dated Mar. 12, 2020.
CNIPA, Second Office Action for CN Application No. 201780078815.3, dated May 27, 2020.
Pantech, "PUCCH resource allocation in response to E-PDCCH," 3GPP TSG RAN1 #69, R1-122456, May 2012, 3 pages.
Research in Motion et al., "PUCCH Resource Efficiency for E-PDCCH," 3GPP TSG RAN WG1 Meeting #70, R1-123623, Aug. 2012, 6 pages.
Research in Motion et al., "Improved PUCCH Resource Efficiency for E-PDCCH," 3GPP TSG RAN WG1 Meeting #70bis, R1-124248, Oct. 2012, 9 pages.
WIPO, ISR for PCT/CN2017/070328, dated Jun. 29, 2017.
CIPO, First Office Action in CA Application 3049275, dated Aug. 12, 2020.
IPO, First Office Action in IN Application 201917026743, dated Aug. 18, 2020.
RFFSIP, First Office Action and Search Report in RU Application 2019124530, dated Jun. 11, 2020.
Intel Corporation, "UL control channel design with long duration," 3GPP TSG-RAN WG1 Meeting #87, R1-1611995, 5 pages.
Ericsson, "On long UCI without simultaneous data transmission," TSG-RAN WG1 Meeting #87, R1-1612919, 2 pages.
Intel Corporation, "Resource allocation for NR uplink control channel," 3GPP TSG-RAN WG1 Meeting #87, R1-1611997, 4 pages.
3GPP Organizational Partners, 3GPP TSG-RAN E-UTRA Physical layer procedures, Release 12, 2015, 241 pages.
INAPI, Chile, First Office Action for CL201901853, dated Oct. 27, 2020.
JPO, Office Action for JP Application No. 2019-536097, dated Feb. 17, 2021.
ILPO, Office Action for IL Application No. 267726, dated Jun. 30, 2021.
TIPO, Office Action for TW Application No. 107100060, dated Jul. 8, 2021.
EPO, Extended European Search Report for EP Application No. 21163420.9, dated Aug. 20, 2021.
IPA, Office Action for AU Application No. 2017391791, dated Oct. 29, 2021.
CNIPA, First Office Action for CN Application No. 202011174772.9, dated Feb. 21, 2022.
JPO, Office Action for JP Application No. 2021-131283, dated Jun. 17, 2022.
IMPI, Office Action for MX Application No. MX/a/2019/008101, dated Oct. 24, 2022.
NOIP, Office Action for VN Application No. 1-2019-03730, dated Aug. 16, 2022.

* cited by examiner

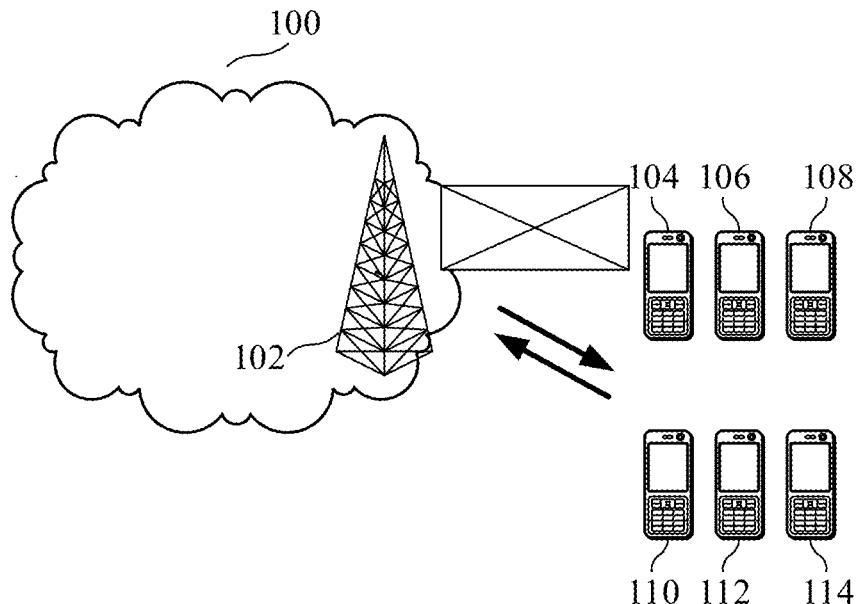

Send, by the network device, a downlink control channel to a terminal device on a first downlink frequency domain control area, wherein the downlink control channel includes first configuration information, and the first configuration information is used to dynamically indicate at least one first uplink frequency domain control area used by the terminal device to send an uplink control channel to the network device ～ S210

Receive, by the network device, the uplink control channel sent by the terminal device on a first uplink frequency domain scheduling unit of each of the at least one first uplink frequency domain control area, wherein a frequency domain position of the first uplink frequency domain scheduling unit in the first uplink frequency domain control area is determined according to the first downlink frequency domain control area ～ S220

FIG. 2

METHOD FOR TRANSMITTING UPLINK CONTROL CHANNEL, NETWORK DEVICE AND TERMINAL DEVICE

CROSS-REFERENCE TO RELATED APPLICATION

This application is a U.S. national phase application of International Application No. PCT/CN2017/070328, filed Jan. 5, 2017, the entire disclosure of which is incorporated herein by reference.

TECHNICAL FIELD

The present disclosure relates to the field of communication, and more particularly to a method for transmitting uplink control channel, a network device and a terminal device.

BACKGROUND

In a Long Term Evolution (LTE) system, resources in a Physical Uplink Control CHannel (PUCCH) for transmitting acknowledgement (ACK)/Negative ACKnowledgement (NACK) acknowledgement information or other uplink control information are implicitly mapped by positions of Physical Downlink Control CHannel (PDCCH). A position for transmitting the PUCCH for a certain terminal device is determined by the first Control Channel Element (CCE) of the PDCCH for scheduling resources for the terminal device, and each CCE has a fixed mapping position in the PUCCH.

Although indicating resources for transmitting PUCCH by implicitly mapping can save signaling overhead, it may cause a series of problems when applying the method in 5G systems. Firstly, since the PUCCH of the 5G system is distributed in a plurality of sub-bands, and the PDCCHs of a plurality of downlink slots may be mapped to the PUCCH of one uplink slot, mapping all the PDCCH resources respectively to the sub-bands of each PUCCH may leave only a small number of resources in the sub-bands of each PUCCH that can be used, and the remaining time-frequency resources that can be used for transmitting the Physical Uplink Shared CHannel (PUSCH) may be split by the PUCCH into disordered resource fragments, which can greatly increase the scheduling complexity of the PUSCH, and reduce the resource utilization efficiency. Secondly, the implicit mapping method cannot utilize the performance gain of frequency selective scheduling, which can affect the performance of PUCCH. Finally, the uplink frequency domain resources may be changed in the 5G systems, which may change the mapping relationship between the resources used for transmitting the PDCCH and the resources used for transmitting the PUCCH, and the fixed mapping relationship can hardly adapt to the dynamically adjusted resource mapping.

In another solution, it is proposed that the frequency domain resources used for transmitting the PUCCH may be dynamically scheduled by the PDCCH. For example, the radio resource control (RRC) signaling and/or the downlink control information (DCI) are used to explicitly indicate the frequency domain resources of the PUCCH for transmitting the PUCCH. However, although the method of dynamically scheduling the frequency domain resources for transmitting the PUCCH with the PDCCH can improve the PUCCH link performance and improve the uplink resource utilization efficiency by utilizing frequency selective scheduling, the complete dynamic scheduling may cause problems of increased implementation complexity and large signaling overhead for the network device.

SUMMARY

The present application provides a method for transmitting an uplink control channel, a network device, and a terminal device, which can reduce scheduling complexity and have low signaling overhead.

In a first aspect, there is provided a method for transmitting an uplink control channel, including: sending, by a network device, a downlink control channel to a terminal device on a first downlink frequency domain control area, wherein the downlink control channel includes first configuration information, and the first configuration information is used to dynamically indicate at least one first uplink frequency domain control area used by the terminal device to send an uplink control channel to the network device; and receiving, by the network device, an uplink control channel sent by the terminal device on a first uplink frequency domain scheduling unit of each of the at least one first uplink frequency domain control area, wherein a frequency domain position of the first uplink frequency domain scheduling unit in the first uplink frequency domain control area is determined according to the first downlink frequency domain control area.

In the method for transmitting an uplink control channel according to the first aspect, the uplink frequency domain control area is indicated through first configuration information, and the position of the uplink frequency domain scheduling unit for transmitting the uplink control channel in the uplink frequency domain control area is determined from the position of the downlink frequency domain control area. Thus, the frequency domain resource for transmitting the uplink control channel can be determined in a manner combining dynamic scheduling and implicit indication. The method can reduce the scheduling complexity of the PUSCH, the signaling overhead, and the scheduling complexity of the network device.

In a possible implementation of the first aspect, the downlink control channel further includes second configuration information, the second configuration information is used to indicate at least one first uplink time domain scheduling unit, and receiving, by the network device, an uplink control channel sent by the terminal device on a first uplink frequency domain scheduling unit of each of the at least one first uplink frequency domain control area, includes: receiving, by the network device, the uplink control channel sent by the terminal device on the first uplink frequency domain scheduling unit in the corresponding first uplink frequency domain control area of the at least one first uplink time domain scheduling unit.

In a possible implementation of the first aspect, sending, by a network device, a downlink control channel to a terminal device on a first downlink frequency domain control area, includes: sending, by the network device, the downlink control channel to the terminal device on the first downlink frequency domain control area of the first downlink time domain scheduling unit; and the second configuration information includes information about an offset of each first uplink frequency domain control area in the at least one first uplink time domain scheduling unit with respect to the first downlink time domain scheduling unit.

In a possible implementation of the first aspect, a position of the first uplink frequency domain scheduling unit in each of the first uplink frequency domain control areas is determined according to a frequency domain location of the first downlink frequency domain control area in the first downlink time domain scheduling unit.

In a possible implementation of the first aspect, the second configuration information is used to indicate N first uplink time domain scheduling units, and the first configuration information is used to indicate N first uplink frequency domain control areas, each of the first uplink frequency domain control areas is located in one of the first uplink time domain scheduling units, any two of the first uplink frequency domain control areas are located in different first uplink time domain scheduling units, and any two of the first uplink frequency domain control areas have the same frequency domain position in the corresponding first uplink time domain scheduling units.

In a possible implementation of the first aspect, the method further includes: sending, by the network device, third configuration information to the terminal device, wherein the third configuration information is used to indicate information for determining a starting frequency domain position of the first uplink frequency domain scheduling unit of each of the at least one first uplink frequency domain control area in each of the at least one first uplink frequency domain control area.

In a possible implementation of the first aspect, sending, by the network device, third configuration information to the terminal device, includes: sending, by the network device, the third configuration information to the terminal device through high layer signaling, the downlink control channel, a broadcast channel, or a system information block SIB.

In a possible implementation of the first aspect, the method further includes: sending, by the network device, fourth configuration information to the terminal device, wherein the fourth configuration information is used to indicate a frequency domain range that the terminal device can use, and the at least one first uplink frequency domain control area is within the frequency domain range.

In a possible implementation of the first aspect, sending, by the network device, fourth configuration information to the terminal device, includes: sending, by the network device, the fourth configuration to the terminal device through high layer signaling, the downlink control channel, a broadcast channel, or a system information block SIB.

In a second aspect, there is a method for transmitting an uplink control channel, including: receiving, by a terminal device, a downlink control channel sent by a network device on a first downlink frequency domain control area, wherein the downlink control channel includes first configuration information, and the first configuration information is used to dynamically indicate at least one first uplink frequency domain control area used by the terminal device to send uplink control channel to the network device; and sending, by the terminal device, an uplink control channel to the network device on the first uplink frequency domain scheduling unit of each of the at least one first uplink frequency domain control area, wherein a frequency domain position of the first uplink frequency domain scheduling unit in the first uplink frequency domain control area is determined according to the first downlink frequency domain control area.

In a possible implementation of the second aspect, the downlink control channel further includes second configuration information, the second configuration information is used to indicate at least one first uplink time domain scheduling unit, and sending, by the terminal device, an uplink control channel to the network device on the first uplink frequency domain scheduling unit of each of the at least one first uplink frequency domain control area, includes: sending, by the terminal device, the uplink control channel to the network device on the first uplink frequency domain scheduling unit in the corresponding first uplink frequency domain control area of the at least one first uplink time domain scheduling unit.

In a possible implementation of the second aspect, receiving, by the terminal device, a downlink control channel sent by a network device on a first downlink frequency domain control area, includes: receiving, by the terminal device, the downlink control channel sent by the network device on the first downlink frequency domain control area of the first downlink time domain scheduling unit; wherein the second configuration information includes information about an offset of each first uplink frequency domain control area in the at least one first uplink time domain scheduling unit with respect to the first downlink time domain scheduling unit.

In a possible implementation of the second aspect, a position of the first uplink frequency domain scheduling unit in each of the first uplink frequency domain control areas may be determined according to a frequency domain position of the first downlink frequency domain control area in the first downlink time domain scheduling unit.

In a possible implementation of the second aspect, the second configuration information is used to indicate N first uplink time domain scheduling units, and the first configuration information is used to indicate N first uplink frequency domain control areas, each of the first uplink frequency domain control areas is located in one of the first uplink time domain scheduling units, any two first uplink frequency domain control areas are located in different first uplink time domain scheduling units, and the frequency domain positions of any two first uplink frequency domain control areas in the corresponding first uplink time domain scheduling units are the same.

In a possible implementation of the second aspect, the method further includes: receiving, by the terminal device, third configuration information sent by the network device, wherein the third configuration information is used to indicate information for determining a starting frequency domain position of the first uplink frequency domain scheduling unit of each of the at least one first uplink frequency domain control area in each of the at least one first uplink frequency domain control area.

In a possible implementation of the second aspect, receiving, by the terminal device, the third configuration information sent by the network device includes: receiving, by the terminal device, the third configuration information sent by the network device through high layer signaling, the downlink control channel, a broadcast channel, or a system information block SIB.

In a possible implementation of the second aspect, the method further includes: receiving, by the terminal device, fourth configuration information sent by the network device, wherein the fourth configuration information is used to indicate a frequency domain range that the terminal device can use, and the at least one first uplink frequency domain control area is within the frequency domain range.

In a possible implementation of the second aspect, receiving, by the terminal device, fourth configuration information sent by the network device includes: receiving, by the terminal device, the fourth configuration information sent by the network device through high layer signaling, the downlink control channel, a broadcast channel, or a system information block SIB.

In a third aspect, there is provided a network device, including modules for performing the method in the first aspect or any possible implementation of the first aspect.

In a fourth aspect, there is provided a network device, including a processor, a memory and a transceiver to perform the method in the first aspect or any possible implementation of the first aspect.

In a fifth aspect, there is provided a terminal device, including modules for performing the method in the second aspect or any possible implementation of the second aspect.

In a sixth aspect, there is provided a terminal device, including a processor, a memory and a transceiver to perform the method in the second aspect or any possible implementation of the second aspect.

In a seventh aspect, there is provided a computer readable medium for storing a computer program, the computer program including instructions for performing the method in the first aspect or any possible implementation of the first aspect.

In an eighth aspect, there is provided a computer readable medium for storing a computer program, the computer program including instructions for performing the method in the second aspect or any possible implementation of the second aspect.

BRIEF DESCRIPTION OF THE DRAWINGS

FIG. 1 is a schematic diagram of a communication system that can be applied to embodiments of the present disclosure.

FIG. 2 is a schematic flowchart of a method for transmitting an uplink control channel according to an embodiment of the present disclosure.

DETAILED DESCRIPTION

Figure 3:
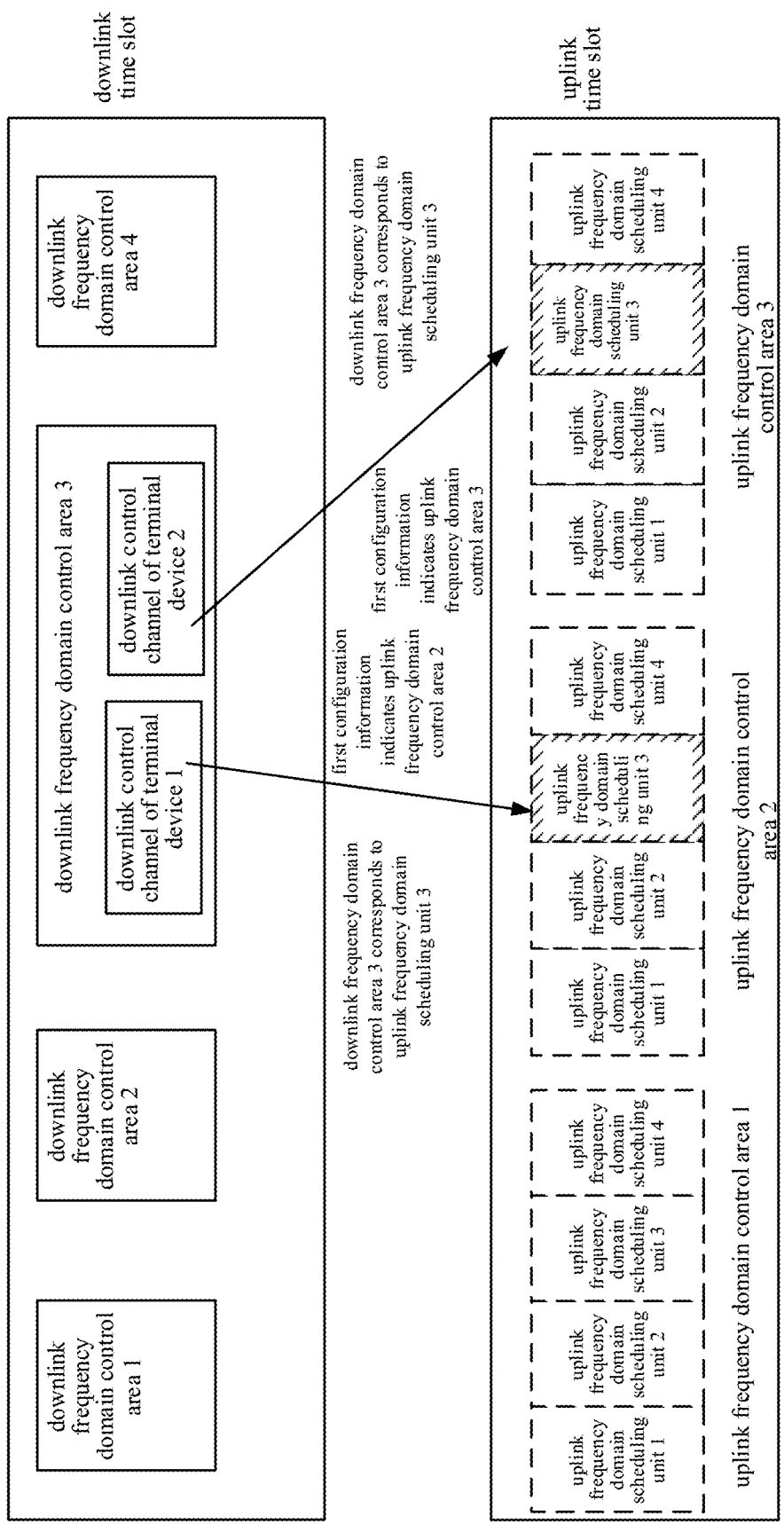
FIG. 3 is a schematic diagram of a method for transmitting an uplink control channel according to an embodiment of the present disclosure.

The technical solutions in the embodiments of the present disclosure will be described below with reference to the accompanying drawings.

FIG. 1 is a schematic diagram of a communication system that can be applied to embodiments of the present disclosure. As shown in FIG. 1, a network 100 can include a network device 102 and terminal devices 104, 106, 108, 110, 112, and 114, wherein the network device and the terminal devices are connected wirelessly. It should be understood that FIG. 1 only illustrates a network including one network device as an example, but the embodiments of the present disclosure are not limited thereto. For example, the network may further include more network devices. Similarly, the network may also include more terminal devices, and the network device can also include other devices.

The present disclosure describes various embodiments in connection with a terminal device. The terminal device can also refer to user equipment (User Equipment, UE), an access terminal, a subscriber unit, a subscriber station, a mobile station, a mobile platform, a remote station, a remote terminal, a mobile device, a user terminal, a terminal, a wireless communication device, and a user agent or a user device. The access terminal can be a cellular phone, a cordless phone, a Session Initiation Protocol (SIP) phone, a Wireless Local Loop (WLL) station, or a Personal Digital Assistant ("PDA"), a handheld device with wireless communication capability, a computing device or other processing device connected to a wireless modem, an in-vehicle device, a wearable device, a terminal device in a future 5G network, or a terminal device in a future public land mobile networks (PLMN) network, etc.

The present disclosure describes various embodiments in connection with a network device. The network device can be a device communicating with the terminal devices, and the network device can be a base station (Base Transceiver Station, BTS) in GSM or CDMA, or a base station (NodeB, NB) in the WCDMA system, or can be an evolved base station (Evolutional Node B, eNB or eNodeB) in a LTE system, or can be a wireless controller in a Cloud Radio Access Network (CRAN) scenario, or the network device can be a relay station, an access point, an in-vehicle device, a wearable device and a network device in a future 5G network or a network device in a future evolved PLMN network.

In a communication system, there are usually two types of control channels, one is a common control channel, and the other is a UE-specific control channel. The common control channel is a control channel used for communicating common information with all terminal devices or a part of terminal devices. The UE-specific control channel is a control channel for communicating control information related to a specified terminal device, such as a configuration signal regarding data transmission. The technical solutions of the embodiments of the present disclosure can be applied to an uplink control channel in a configuration control channel for transmitting configurations for a terminal.

In a communication system, a control area is also called a control resource set, and is divided into an uplink control area and a downlink control area depending on uplink or downlink. Different from the 4G system, the control area in the 5G system is no longer divided according to the time-frequency dimension, but the time domain and the frequency domain are separated. The time domain control area and the frequency domain control area are separately discussed.

The frequency domain control area does not cover the entire system bandwidth, but only covers some of the frequency domain resources. The frequency domain control area can be composed of a plurality of physical resource blocks (PRBs) or resource blocks (RBs) that are consecutive or non-consecutive in the frequency domain. The PRB or RB is the smallest scheduling unit in the frequency domain, called a frequency domain scheduling unit. It should be understood that, in addition to the PRB or the RB, the frequency domain scheduling unit can be a frequency domain unit of other granularity, which is not limited by the embodiments of the present disclosure. The time domain control area is composed of a plurality of time domain scheduling units that are consecutive or non-consecutive in the time domain. The time domain scheduling unit is the smallest scheduling unit in the time domain, and can be a time slot, a sub-frame, a frame, or one or more Orthogonal Frequency Division Multiplexing (OFDM) symbols, etc.

A control channel can be transmitted through one or several Control Channel Elements (CCEs), such as 1, 2, 4, 8, . . . control channel elements, which is also known as a control channel element aggregation level (CCE Aggregation Level, CCE AL). One control channel element can be composed of several control resource units, one control resource unit is a time-frequency resource composed of one PRB in the frequency domain and one time slot (or several OFDM symbols) in the time domain, which can be considered as the smallest resource unit used for control channel transmission.

Specific downlink time domain control area and downlink frequency domain control area can constitute a downlink time-frequency area. In addition to the downlink time domain resource and the downlink frequency domain resource, the downlink time-frequency area can further include a specific code domain resource and/or a beam domain resource. Different downlink time-frequency areas can partially overlap in the time domain, the frequency domain, the code domain, and/or the beam domain, which is not limited by the embodiments of the present disclosure. Similarly, specific uplink time domain control area and uplink frequency domain control area can constitute an uplink time-frequency area. In addition to the uplink time domain resource and the uplink frequency domain resource, the uplink time-frequency area can further include a specific code domain resource and/or a beam domain resource. Different uplink time-frequency areas can partially overlap in the time domain, the frequency domain, the code domain, and/or the beam domain, which is not limited by the embodiments of the present disclosure.

It should be understood that positions are mentioned in the embodiments of the present disclosure, for example, the position of the uplink frequency domain scheduling unit refers to the relative position of the uplink frequency domain scheduling unit in the corresponding uplink frequency domain control area, and the position of the downlink frequency domain control area refers to the relative position of the downlink frequency domain control area in all frequency domain control areas of the corresponding downlink time domain scheduling unit. The position of the uplink control channel can include its specific positions in the time domain, the frequency domain, the code domain, and the beam domain. Embodiments of the present disclosure mainly focus on the time domain and the frequency domain.

It should also be understood that, in general, time-frequency resources that are not used for transmitting an uplink control channel in uplink time-frequency resources can be used for transmitting uplink data.

FIG. 2 is a schematic flowchart of a method 200 for transmitting an uplink control channel according to an embodiment of the present disclosure. The method 200 can be performed by a network device, and the method includes the following steps.

In S210, the network device sends a downlink control channel to a terminal device on a first downlink frequency domain control area, wherein the downlink control channel includes first configuration information, and the first configuration information is used to dynamically indicate at least one first uplink frequency domain control area used by the terminal device to send an uplink control channel to the network device.

In S220, the network device receives the uplink control channel sent by the terminal device on a first uplink frequency domain scheduling unit of each of the at least one first uplink frequency domain control area, wherein a frequency domain position of the first uplink frequency domain scheduling unit in the first uplink frequency domain control area is determined according to the first downlink frequency domain control area.

In the method for transmitting an uplink control channel according to the embodiment of the present disclosure, the uplink frequency domain control area is indicated through first configuration information, and the position of the uplink frequency domain scheduling unit for transmitting the uplink control channel in the uplink frequency domain control area is determined from the position of the downlink frequency domain control area. Thus, the frequency domain resource for transmitting the uplink control channel can be determined in a manner combining dynamic scheduling and implicit indication. The method can reduce the scheduling complexity of the PUSCH, the signaling overhead, and the scheduling complexity of the network device.

It should be understood that the at least one first uplink frequency domain control area in the embodiment of the present disclosure can all be located in the same uplink time domain scheduling unit; or can be located in different uplink time domain scheduling units respectively; or it is possible that a part of the first uplink frequency domain control areas are located on the same uplink time domain scheduling unit and the other part of the first uplink frequency domain control areas are located on other uplink time domain scheduling units, which will be described in detail below in the embodiments of the present disclosure.

In the embodiments of the present disclosure, the uplink frequency domain control area is dynamically scheduled through the first configuration information, and the network device can flexibly select the uplink frequency domain control area according to the current channel condition of each frequency band. Since in a frequency band (one uplink frequency domain control area), there is no large difference between the channel conditions of the uplink frequency domain scheduling units, so implicit mapping is realized by sending the position of the downlink frequency domain control area of the downlink control channel, and dynamic scheduling is not performed.

It should be further understood that the embodiments of the present disclosure do not completely utilize the implicit indication manner and thus do not need to set all the frequency resources that may transmit the uplink control channel to the uplink frequency domain control area, as in the conventional implicit indication manner. This can save resources and improve resource utilization efficiency. In addition, in order to improve the link performance of the uplink control channel by utilizing frequency selective scheduling, the frequency band occupied by the uplink frequency domain control area can be flexibly adjusted according to the system requirements. For example, the uplink frequency domain control area can be set to be distributed throughout the working frequency band as evenly as possible, and the frequency selective scheduling can be utilized to improve the link performance of the uplink control channel.

The method for transmitting an uplink control channel in the embodiment of the present disclosure will be described in detail below in conjunction with several specific scenarios.

FIG. 3 is a schematic diagram showing a method for transmitting an uplink control channel according to an embodiment of the present disclosure. In this specific scenario, as shown in FIG. 3, a downlink time domain scheduling unit (for example, a downlink time slot) in the system is fixedly corresponding to one uplink time domain scheduling unit (for example, an uplink time slot). In this case, the resource used for transmitting the uplink control channel must be on the uplink time domain scheduling unit, and only the frequency domain position of the resource needs to be determined.

It is assumed that the downlink time slot includes S (S=4) downlink frequency domain control areas: a downlink frequency domain control area 1, a downlink frequency domain control area 2, a downlink frequency domain control area 3, and a downlink frequency domain control area 4. The network device sends a downlink control channel to the terminal device in the downlink frequency domain control area s (s=3) among the four downlink frequency domain control areas. Two terminal devices, i.e., a terminal device 1 and a terminal device 2, are shown in FIG. 3, and their downlink control channels are all transmitted in the downlink frequency domain control area 3.

It is assumed that the uplink time slot includes T (T=3) uplink frequency domain control areas: an uplink frequency domain control area 1, an uplink frequency domain control area 2, and an uplink frequency domain control area 3. The frequency domain resource in the embodiment of the present disclosure is designed to set S uplink frequency domain scheduling units on each uplink frequency domain control area to correspond to the S downlink frequency domain control areas.

For the terminal device 1, the downlink control channel sent by the network device on the downlink frequency domain control area 3 to the terminal device 1 includes first configuration information, and the first configuration information includes information on the uplink frequency domain control area used by the uplink control channel of the terminal device 1, such as the uplink frequency domain control area 2 in the example of FIG. 3. The uplink frequency domain scheduling unit used by the uplink control channel of the terminal device 1 is determined through a mapping relationship f(s), where f(s)=s. That is, the uplink frequency domain scheduling unit 3 of the four uplink frequency domain scheduling units of the uplink frequency domain control area 2 is used for transmitting the uplink control channel.

For the terminal device 2, the downlink control channel sent by the network device on the downlink frequency domain control area 3 to the terminal device 2 includes first configuration information, and the first configuration information includes information on the uplink frequency domain control area used by the uplink control channel of the terminal device 2, such as the uplink frequency domain control area 3 in the example of FIG. 3. The uplink frequency domain scheduling unit used by the uplink control channel of the terminal device 2 is determined through a mapping relationship f(s), where f(s)=s. That is, the uplink frequency domain scheduling unit 3 among the four uplink frequency domain scheduling units of the uplink frequency domain control area 3 is used for transmitting the uplink control channel.

The network device can configure the mapping relationship f(s) of the uplink frequency domain scheduling unit corresponding to the downlink frequency domain control area through high layer signaling, such as RRC signaling. For example, the mapping of the uplink frequency domain scheduling unit is performed by assigning serial numbers to a plurality of downlink frequency domain control areas of the downlink time slot, and assigning serial numbers to the uplink frequency domain scheduling units in each uplink frequency domain control area, wherein the serial number of the downlink frequency domain control area is the serial number of the uplink frequency domain scheduling unit. A specific method for indicating the uplink frequency domain control area is assigning serial numbers to a plurality of uplink frequency domain control areas of the uplink time slot, and indicating the serial number in the first configuration information. In general, the position of the first uplink frequency domain scheduling unit in the first uplink frequency domain control area is determined according to a frequency domain position of the first downlink frequency domain control area in the first downlink time domain scheduling unit.

It should be understood that in the schematic diagram shown in FIG. 3, the first configuration information indicates only one first uplink frequency domain control area. In an embodiment of the present disclosure, the first configuration information can indicate a plurality of first uplink frequency domain control areas in the uplink time slot.

It should also be understood that one downlink time domain scheduling unit in the schematic diagram shown in FIG. 3 is fixedly corresponding to one uplink time domain scheduling unit. In other scenarios, one downlink time domain scheduling unit can be fixedly corresponding to a plurality of uplink time domain scheduling units; or one downlink time domain scheduling unit can selectively correspond to one of a plurality of uplink time domain scheduling units according to system requirements. In this case, the time domain resource occupied for transmission of the uplink control channel also needs to be indicated, that is, which uplink time domain scheduling unit the uplink control channel is transmitted on needs to be indicated.

Optionally, the downlink control channel further includes second configuration information, wherein the second configuration information is used to indicate the at least one first uplink time domain scheduling unit. The network device receiving the uplink control channel sent by the terminal device on a first uplink frequency domain scheduling unit of each of the at least one first uplink frequency domain control area in S220 can include: the network device receiving the uplink control channel sent by the terminal device on the first uplink frequency domain scheduling unit in the corresponding first uplink frequency domain control area of the at least one first uplink time domain scheduling unit.

Figure 4:
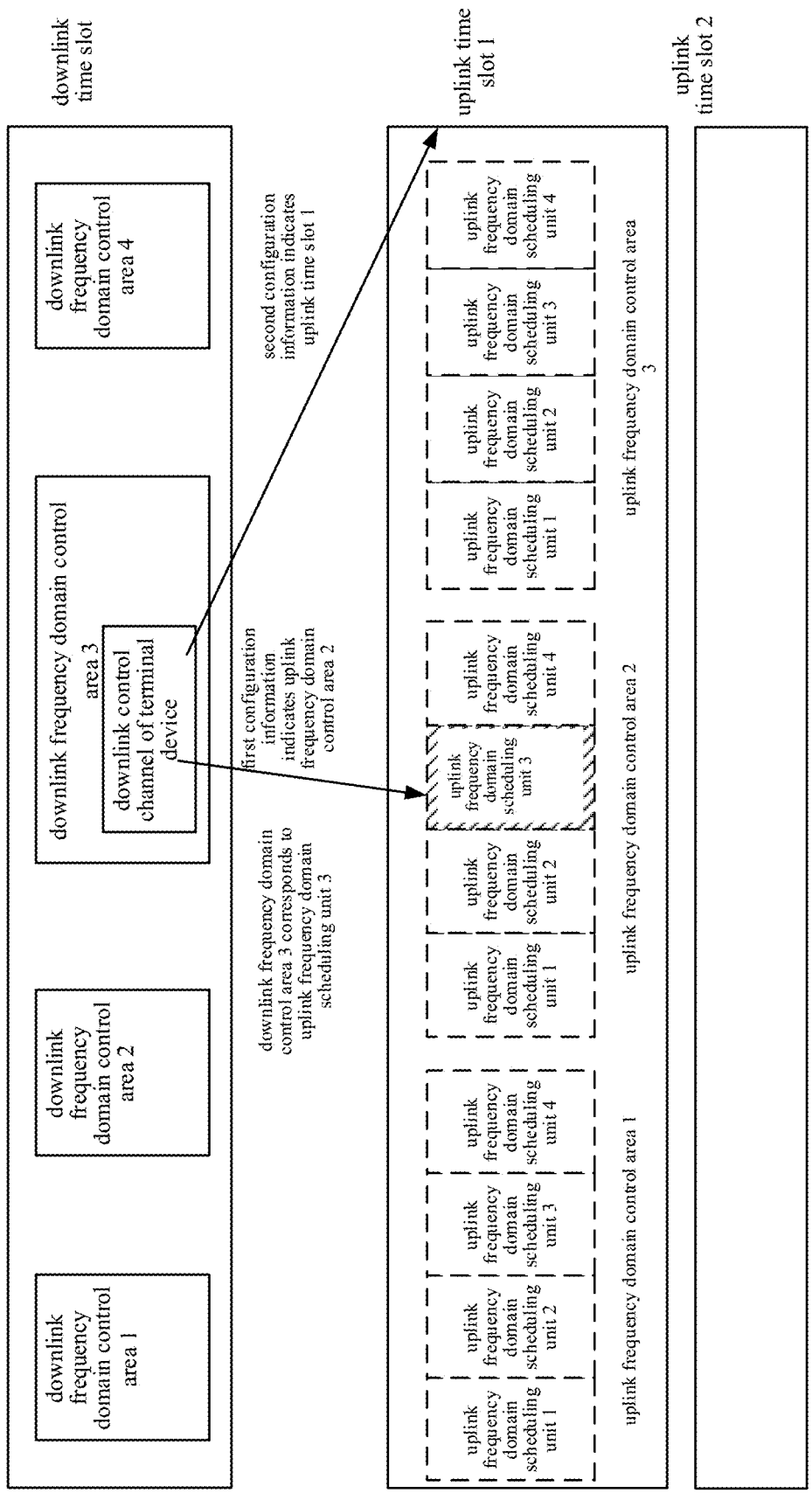
FIG. 4 is a schematic diagram of a method for transmitting an uplink control channel according to another embodiment of the present disclosure.

FIG. 4 is a schematic diagram showing a method for transmitting an uplink control channel according to another embodiment of the present disclosure. In this specific scenario, as shown in FIG. 4, one downlink time domain scheduling unit (for example, a downlink time slot) in the system corresponds to two uplink time domain scheduling units (for example, an uplink time slot 1 and an uplink time slot 2). The network device sends a downlink control channel to the terminal device on the downlink frequency domain control area 3. The downlink control channel includes second configuration information in addition to the first configuration information indicating the uplink frequency domain control area 2, and the second configuration information is used to indicate that the uplink control channel is transmitted on the uplink time slot 1. Finally, the uplink frequency domain scheduling unit 3 of the four uplink frequency domain scheduling units of the uplink frequency domain control area 2 in the uplink time slot 1 is used for transmitting the uplink control channel.

Specifically, the network device sending a downlink control channel to a terminal device on a first downlink frequency domain control area in S210 can include: the network device sending a downlink control channel to the terminal device on a first downlink frequency domain control area of a first downlink time domain scheduling unit; wherein the second configuration information includes information about an offset of each first uplink frequency domain control area in the at least one first uplink time domain scheduling unit with respect to the first downlink time domain scheduling unit. The system can also assign a serial number to the uplink time slot, and the second configuration information indicates the serial number of the uplink time slot used for transmitting the uplink control channel. The specific manner for indicating the uplink time slot is not limited in the embodiments of the present disclosure.

FIG. 4 illustrates transmitting the uplink control channel in only one uplink time slot. However, the uplink control channel of the embodiments of the present disclosure can be transmitted in a plurality of uplink time slots. In this case, the second configuration information can indicate serial numbers of the plurality of uplink time slots, or indicate a serial number of a starting uplink time slot and relative offsets of other uplink time slots of the plurality of uplink time slots with respect to the starting uplink time slot in the time domain, or indicate the serial number of the starting uplink time slot and the number of consecutive uplink time slots, and so on. The specific manner for indicating the plurality of uplink time slots is not limited in the embodiments of the present disclosure.

The first configuration information can also have various indication manners. One of the indication manners is: if the system assigns serial numbers to uplink frequency domain control areas in each uplink time slot separately, and all uplink time slots use the uplink frequency domain control area of the same serial number to transmit the uplink control channel, the first configuration information still only indicates the serial number of the uplink frequency domain control area, and the serial number applies to the uplink control channel of all uplink time slots.

In general, the second configuration information is used to indicate N first uplink time domain scheduling units, and the first configuration information is used to indicate N first uplink frequency domain control areas, wherein each of the first uplink frequency domain control areas is located in one of the first uplink time domain scheduling units, any two first uplink frequency domain control areas are located in different first uplink time domain scheduling units, and frequency domain positions of any two first uplink frequency domain control areas in the corresponding first uplink time domain scheduling unit are the same.

Another indication manner of the first configuration information is that if the system sequentially assigns serial numbers to all uplink frequency domain control areas in all uplink time slots, since there is no duplicate serial number in the plurality of uplink frequency domain control areas, the first configuration information just indicates the serial numbers of all the uplink frequency domain control areas. Another indication manner of the first configuration information is that if the system assigns serial numbers the uplink frequency domain control areas in each uplink time slot separately, and in two uplink time slots, uplink frequency domain control areas of different serial numbers are used for transmitting the uplink control channel, the first configuration information indicates the serial number of the uplink frequency domain control area in each uplink time slot. In the embodiments of the present disclosure, the specific indication manner of the first configuration information is not limited.

Figure 5:
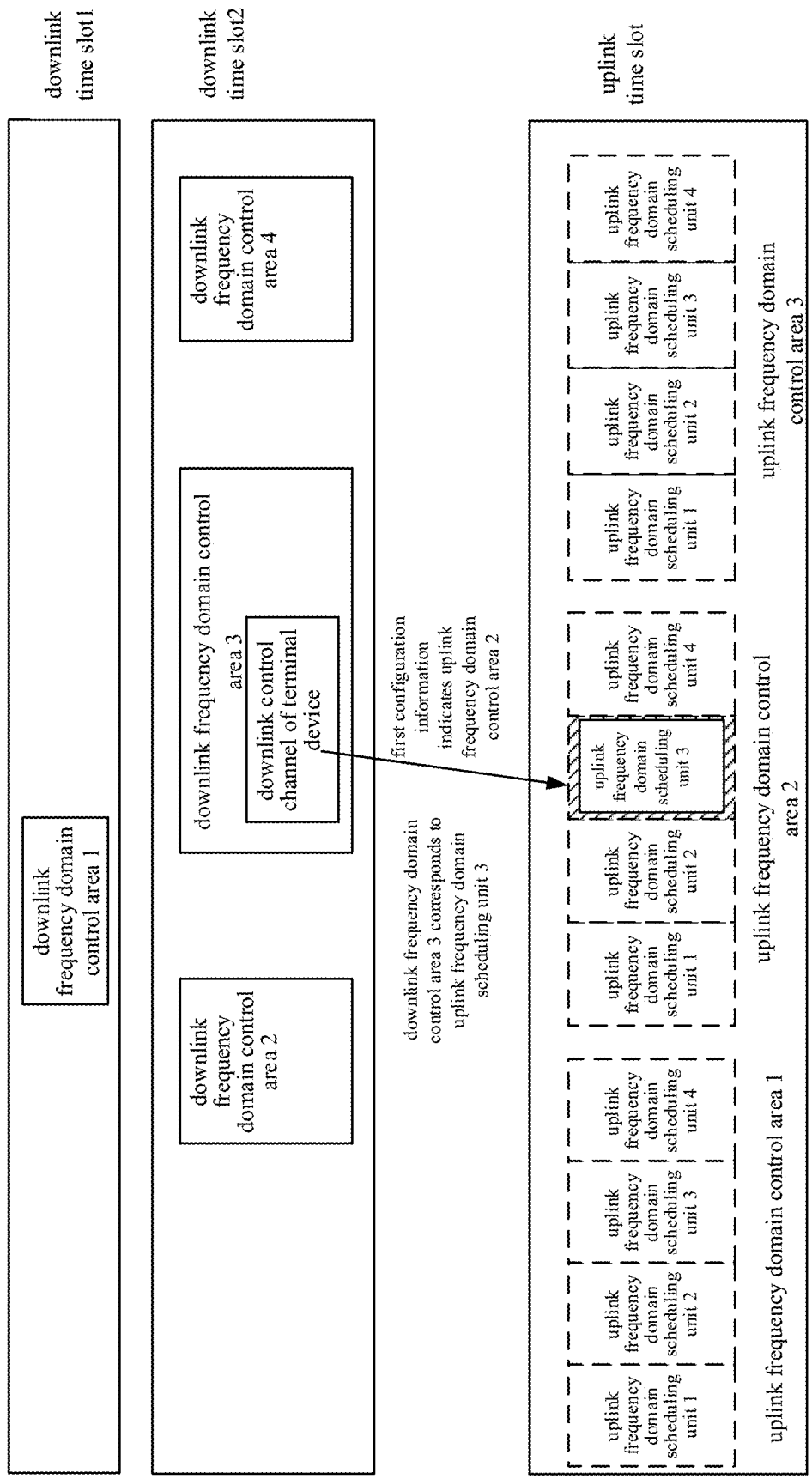
FIG. 5 is a schematic diagram of a method for transmitting an uplink control channel according to another embodiment of the present disclosure.

FIG. 5 is a schematic diagram of a method for transmitting an uplink control channel according to another embodiment of the present disclosure. In this specific scenario, as shown in FIG. 5, a plurality of (for example, two) downlink time domain scheduling units (for example, a downlink time slot 1 and a downlink time slot 2) in the system correspond to one uplink time domain scheduling unit (for example, the uplink time slot). In this case, the system sequentially assigns serial numbers to all downlink frequency domain control areas in all downlink time slots, and there is no duplicate serial number in all downlink frequency domain control areas in the plurality of downlink time slots and there are a total of K downlink frequency domain control areas. Each uplink frequency domain control area in the uplink time domain scheduling unit includes K uplink frequency domain scheduling units.

As shown in FIG. 5, it is assumed that the downlink time slot 1 includes one downlink frequency domain control area (i.e., a downlink frequency domain control area 1); the downlink time slot 2 includes three downlink frequency domain control areas: a downlink frequency domain control area 2, a downlink frequency domain control area 3 and a downlink frequency domain control area 4. The network device sends a downlink control channel to the terminal device in the downlink frequency domain control area 3 among the three downlink frequency domain control areas of the downlink time slot 2. The uplink time domain scheduling unit (the uplink time slot) includes three uplink frequency domain control areas: an uplink frequency domain control area 1, an uplink frequency domain control area 2, and an uplink frequency domain control area 3. Each uplink frequency domain control area includes four uplink frequency domain scheduling units, corresponding to one downlink frequency domain control area in the downlink slot 1 and three downlink frequency domain control areas in the downlink slot 2.

The downlink control channel sent by the network device to the terminal device on the downlink frequency domain control area 3 includes first configuration information, wherein the first configuration information includes information about an uplink frequency domain control area used by the uplink control channel of the terminal device, for example, the uplink frequency domain control area 2 in the example of FIG. 5. The uplink frequency domain scheduling unit used by the uplink control channel of the terminal device is determined by a mapping relationship f(s), here f(s)=s. That is, the uplink frequency domain scheduling unit 3 of the four uplink frequency domain scheduling units of the uplink frequency domain control area 2 is used for transmitting the uplink control channel.

Figure 6:
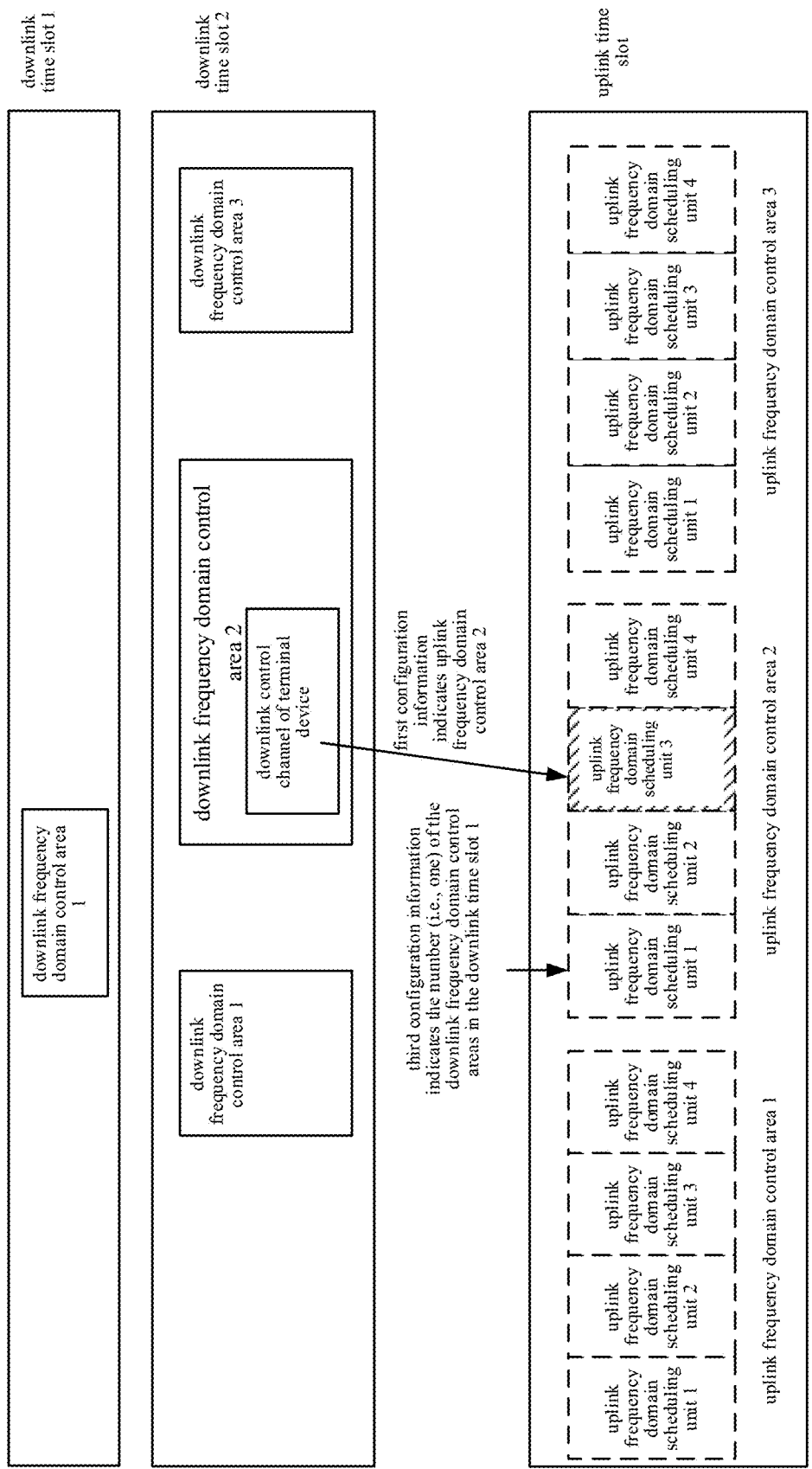
FIG. 6 is a schematic diagram of a method for transmitting an uplink control channel according to another embodiment of the present disclosure.

FIG. 6 is a schematic diagram showing a method for transmitting an uplink control channel according to another embodiment of the present disclosure. In this specific scenario, as shown in FIG. 6, a plurality of (for example, two) downlink time domain scheduling units (for example, a downlink time slot 1 and a downlink time slot 2) in the system correspond to one uplink time domain scheduling unit (for example, the uplink time slot). In this case, the system assigns serial numbers to the downlink frequency domain control areas in each downlink time slot separately, and a total of K downlink frequency domain control areas are in the plurality of downlink time slots. Each uplink frequency domain control area in the uplink time domain scheduling unit includes K uplink frequency domain scheduling units.

As shown in FIG. 6, it is assumed that the downlink time slot 1 includes one downlink frequency domain control area (i.e., a downlink frequency domain control area 1); the downlink time slot 2 includes three downlink frequency domain control areas: a downlink frequency domain control area 1 and a downlink frequency domain control area 2 and a downlink frequency domain control area 3. The network device sends a downlink control channel to the terminal device in the downlink frequency domain control area 2 in the three downlink frequency domain control areas of the downlink time slot 2. The uplink time domain scheduling unit (the uplink time slot) includes three uplink frequency domain control areas: an uplink frequency domain control area 1, an uplink frequency domain control area 2, and an uplink frequency domain control area 3. Each uplink frequency domain control area includes four uplink frequency domain scheduling units, corresponding to one downlink frequency domain control area in the downlink slot 1 and three downlink frequency domain control areas in the downlink slot 2.

In this case, the method 200 can further include: the network device sending third configuration information to the terminal device, wherein the third configuration information is used to indicate information for determining a starting frequency domain position of the first uplink frequency domain scheduling unit of each of the at least one first uplink frequency domain control area in each of the at least one first uplink frequency domain control area.

Specifically, in a specific example, the network device can exchange condition of the downlink frequency domain control areas (including at least the number of downlink frequency domain control areas) in each downlink time slot with the terminal device through high layer signaling. The third configuration information can include the serial number of the downlink time slot, so that the terminal device can learn about the starting position of the uplink frequency domain scheduling unit for transmitting the uplink control channel in each uplink frequency domain control area in the uplink time slot according to the serial number of the downlink time slot and the number of downlink frequency domain control areas in each time slot.

In another specific example, the third configuration information can include the number f(p) of downlink frequency domain control areas of all downlink time slots before the selected downlink time slot, so that the terminal device can learn about the starting position of the uplink frequency domain scheduling unit for transmitting the uplink control channel in each uplink frequency domain control area in the uplink time slot according to the number. The specific position of the uplink control channel of the terminal device in the first uplink frequency control area indicated by the first configuration information is jointly determined through f(p) and f(s). That is, the number of uplink frequency domain scheduling units occupied by the uplink control channel mapped with other downlink time slots is determined through f(p), so as to determine the starting point of the uplink frequency domain scheduling unit occupied by the uplink control channel mapped with the downlink time slot in which the downlink control channel of the terminal device is located, and then based on the starting position, the specific position is determined through f(n).

The downlink control channel sent by the network device to the terminal device on the downlink frequency domain control area 2 (s=2) of the downlink time slot 2 includes first configuration information, wherein the first configuration information includes information of the uplink frequency domain control area used by the uplink control channel of the terminal device, for example, the uplink frequency domain control area 2 in the example of FIG. 6. The network device can send third configuration information to the terminal device, wherein the third configuration information includes the number (1) of the downlink frequency domain control areas in the downlink time slot 1 before the downlink time slot 2, that is, f(p)=1. The uplink frequency domain scheduling unit used by the uplink control channel of the terminal device is determined through f(p)+f(s), here f(s)=s, and f(p)+f(s)=3. That is, the uplink frequency domain scheduling unit 3 in the four uplink frequency domain scheduling units of the uplink frequency domain control area 2 is used for transmitting the uplink control channel.

The coverage band of the 5G system can be very wide (especially in the high frequency band), which may make the terminal device to consume a large amount of terminal equipment resources to detect the control channel over the entire frequency band, so the terminal can support only a certain frequency domain range (or frequency domain bandwidth). Alternatively, the terminal device covers all coverage bands in the downlink direction and covers only a certain frequency domain range in the uplink direction. In this case, the method 200 can further include: the network device sends fourth configuration information to the terminal device, wherein the fourth configuration information is used to indicate a frequency domain range that the terminal device can use, and the at least one first uplink frequency domain control area is within the frequency domain range.

In other words, the network device can send fourth configuration information to the terminal device, indicating a frequency domain range W within the system bandwidth. Then, the first configuration information indicates that the uplink control channel of the terminal device is sent in the first uplink frequency domain control area in the uplink frequency domain control area within the W. The frequency domain range W can include consecutive frequency domain resources, and can also include non-consecutive frequency domain resources, which is not limited in the embodiments of the present disclosure.

Figure 7:
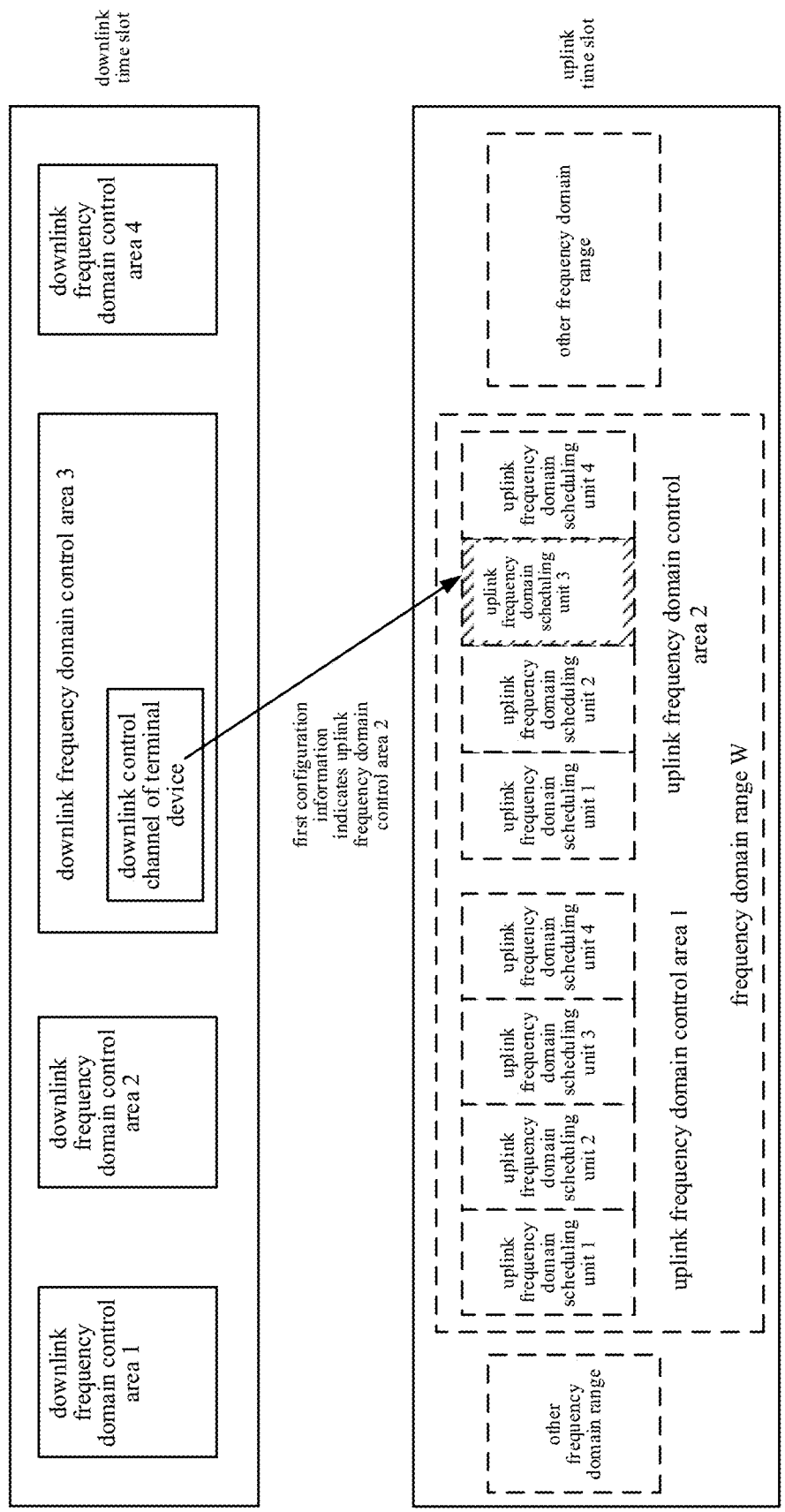
FIG. 7 is a schematic diagram of a method for transmitting an uplink control channel according to another embodiment of the present disclosure.

FIG. 7 is a schematic diagram showing a method for transmitting an uplink control channel according to another embodiment of the present disclosure. In this specific scenario, as shown in FIG. 7, for example, the uplink control channel of the terminal device is limited to a frequency domain range W (sub-band), and one downlink time slot corresponds to one fixed uplink time slot. The network device first indicates through the fourth configuration information a frequency domain range W that the uplink control channel of the terminal device can be distributed, and then indicates through the first configuration information that the uplink control channel of the terminal device is scheduled to be sent on the uplink frequency domain control area 2 in the two downlink uplink frequency domain control area within W. The specific position of the uplink control channel of the terminal device in the downlink frequency domain control area 2 is determined in the uplink frequency domain control area (the uplink frequency domain control area 3) where the downlink control channel of the terminal device is located, that is, on the third uplink frequency domain scheduling unit 3.

Optionally, in the embodiment of the present disclosure, the network device can send the third configuration information and/or the fourth configuration information to the terminal device through high layer signaling (such as RRC signaling), a downlink control channel, a broadcast channel, or a system information block (SIB), which is not limited in the embodiment of the present disclosure.

Figure 8:
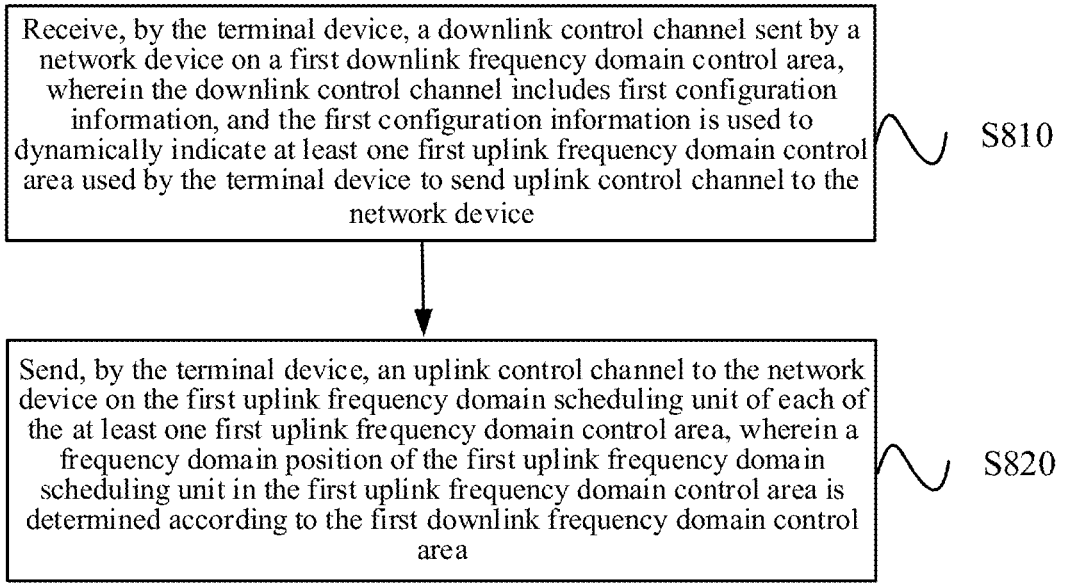
FIG. 8 is a schematic flowchart of a method for transmitting an uplink control channel according to another embodiment of the present disclosure.

FIG. 8 is a schematic flowchart of a method 800 for transmitting an uplink control channel according to an embodiment of the present disclosure. The method 800 can be performed by a terminal device, and the method includes the following steps.

In S810, the terminal device receives a downlink control channel sent by a network device on a first downlink frequency domain control area, wherein the downlink control channel includes first configuration information, and the first configuration information is used to dynamically indicate at least one first uplink frequency domain control area used by the terminal device to send an uplink control channel to the network device.

In S820, the terminal device sends an uplink control channel to the network device on the first uplink frequency domain scheduling unit of each of the at least one first uplink frequency domain control area, wherein a frequency domain position of the first uplink frequency domain scheduling unit in the first uplink frequency domain control area is determined according to the first downlink frequency domain control area.

In the method for transmitting an uplink control channel according to the embodiment of the present disclosure, the uplink frequency domain control area is indicated through first configuration information, and the position of the uplink frequency domain scheduling unit for transmitting the uplink control channel in the uplink frequency domain control area is determined from the position of the downlink frequency domain control area. Thus, the frequency domain resource for transmitting the uplink control channel can be determined in a manner combining dynamic scheduling and implicit indication. The method can reduce the scheduling complexity of the PUSCH, the signaling overhead, and the scheduling complexity of the network device.

Optionally, as an embodiment, the downlink control channel further includes second configuration information, wherein the second configuration information is used to indicate at least one first uplink time domain scheduling unit, and the terminal device sending an uplink control channel to the network device on the first uplink frequency domain scheduling unit of each of the at least one first uplink frequency domain control area in S820 can include: the terminal device sending the uplink control channel to the network device on the first uplink frequency domain scheduling unit in the corresponding first uplink frequency domain control area of the at least one first uplink time domain scheduling unit.

Optionally, as an embodiment, the terminal device receiving a downlink control channel sent by a network device on a first downlink frequency domain control area in S810 can include: the terminal device receiving the downlink control channel sent by the network device on the first downlink frequency domain control area of the first downlink time domain scheduling unit; wherein the second configuration information includes information about an offset of each first uplink frequency domain control area in the at least one first uplink time domain scheduling unit with respect to the first downlink time domain scheduling unit.

Optionally, as an embodiment, the position of the first uplink frequency domain scheduling unit in each of the first uplink frequency domain control areas may be determined according to a frequency domain position of the first downlink frequency domain control area in the first downlink time domain scheduling unit.

Optionally, as an embodiment, the second configuration information can be used to indicate N first uplink time domain scheduling units, and the first configuration information can be used to indicate N first uplink frequency domain control areas, wherein each of the first uplink frequency domain control areas is located in one of the first uplink time domain scheduling units, any two first uplink frequency domain control areas are located in different first uplink time domain scheduling units, and the frequency domain positions of any two first uplink frequency domain control areas in the corresponding first uplink time domain scheduling units are the same.

Optionally, as an embodiment, the method 800 can further include: the terminal device receiving third configuration information sent by the network device, wherein the third configuration information is used to indicate information for determining a starting frequency domain position of the first uplink frequency domain scheduling unit of each of the at least one first uplink frequency domain control area in each of the at least one first uplink frequency domain control area.

In an embodiment of the present disclosure, the terminal device receiving the third configuration information sent by the network device can include: the terminal device receiving the third configuration information sent by the network device through high layer signaling, the downlink control channel, a broadcast channel, or a system information block SIB.

Optionally, as an embodiment, the method 800 can further include: the terminal device receiving fourth configuration information sent by the network device, wherein the fourth configuration information is used to indicate a frequency domain range that the terminal device can use, and the at least one first uplink frequency domain control area is an uplink frequency domain control area within the frequency domain range.

In an embodiment of the present disclosure, the terminal device receiving the fourth configuration information sent by the network device can include: the terminal device receiving the fourth configuration information sent by the network device through high layer signaling, the downlink control channel, a broadcast channel, or a system information block SIB.

It should be understood that, in various embodiments of the present disclosure, the sequence numbers of the above processes does not mean the order of execution, and the order of execution of each process should be determined by its function and internal logic, and it should not constitute any limitation on the implementation process of the embodiments of the present disclosure.

The method for transmitting a signal according to the embodiments of the present disclosure have been described in detail above, and a network device and a terminal device according to the embodiment of the present disclosure will be described below. It should be understood that the network device and the terminal device in the embodiments of the present disclosure can perform various methods in the foregoing embodiments of the present disclosure. That is, for the specific working processes of the following various devices, reference can be made to the corresponding processes in the foregoing method embodiments.

Figure 9:
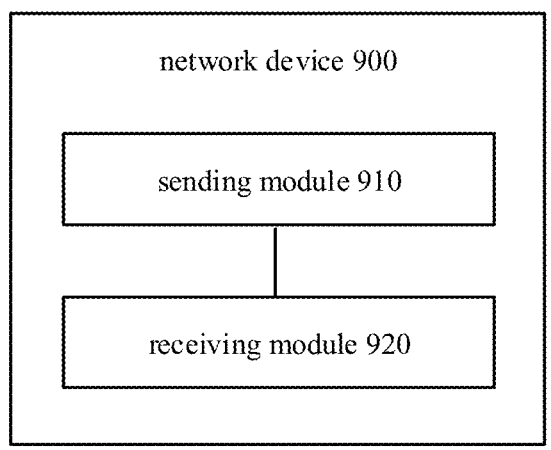
FIG. 9 is a schematic block diagram of a network device according to an embodiment of the present disclosure.

FIG. 9 shows a schematic block diagram of a network device 900 according to one embodiment of the present disclosure. As shown in FIG. 9, the network device 900 includes a sending module 910 and a receiving module 920.

The sending module 910 is configured to send a downlink control channel to a terminal device on a first downlink frequency domain control area, wherein the downlink control channel includes first configuration information, and the first configuration information is used to dynamically indicate at least one first uplink frequency domain control area used by the terminal device to send an uplink control channel to the network device.

The receiving module 920 is configured to receive an uplink control channel sent by the terminal device on a first uplink frequency domain scheduling unit of each of the at least one first uplink frequency domain control area, wherein a frequency domain position of the first uplink frequency domain scheduling unit in the first uplink frequency domain control area is determined according to the first downlink frequency domain control area.

In the network device according to the embodiment of the present disclosure, the uplink frequency domain control area is indicated through first configuration information, and the position of the uplink frequency domain scheduling unit for transmitting the uplink control channel in the uplink frequency domain control area is determined from the position of the downlink frequency domain control area. Thus, the frequency domain resource for transmitting the uplink control channel can be determined in a manner combining dynamic scheduling and implicit indication. The device can reduce the scheduling complexity of the PUSCH, the signaling overhead, and the scheduling complexity of the network device.

Optionally, as an embodiment, the downlink control channel further includes second configuration information, wherein the second configuration information is used to indicate at least one first uplink time domain scheduling unit, and the receiving module 920 is specifically configured to receive the uplink control channel sent by the terminal device on the first uplink frequency domain scheduling unit in the corresponding first uplink frequency domain control area of the at least one first uplink time domain scheduling unit.

Optionally, as an embodiment, the sending module 910 is specifically configured to send the downlink control channel to the terminal device on the first downlink frequency domain control area of the first downlink time domain scheduling unit; wherein the second configuration information includes information about an offset of each first uplink frequency domain control area in the at least one first uplink time domain scheduling unit with respect to the first downlink time domain scheduling unit.

Optionally, as an embodiment, a position of the first uplink frequency domain scheduling unit in each of the first uplink frequency domain control areas is determined according to a frequency domain position of the first downlink frequency domain control area in the first downlink time domain scheduling unit.

Optionally, as an embodiment, the second configuration information is used to indicate N first uplink time domain scheduling units, and the first configuration information is used to indicate N first uplink frequency domain control areas. Each of the first uplink frequency domain control areas is located in one of the first uplink time domain scheduling units, any two of the first uplink frequency domain control areas are located in different first uplink time domain scheduling units, and any two of the first uplink frequency domain control areas have the same frequency domain position in the corresponding first uplink time domain scheduling units.

Optionally, as an embodiment, the sending module 910 is further configured to send third configuration information to the terminal device, wherein the third configuration information is used to indicate information for determining a starting frequency domain position of the first uplink frequency domain scheduling unit of each of the at least one first uplink frequency domain control area in each of the at least one first uplink frequency domain control area.

Optionally, in an embodiment of the present disclosure, the sending module 910 can be specifically configured to send the third configuration information to the terminal device through high layer signaling, the downlink control channel, a broadcast channel, or a system information block SIB.

Optionally, as an embodiment, the sending module 910 is further configured to send fourth configuration information to the terminal device, wherein the fourth configuration information is used to indicate a frequency domain range that the terminal device can use, and the at least one first uplink frequency domain control area is an uplink frequency domain control area within the frequency domain range.

Optionally, in an embodiment of the present disclosure, the sending module 910 can be specifically configured to send the fourth configuration to the terminal device through high layer signaling, the downlink control channel, a broadcast channel, or a system information block SIB.

Figure 10:
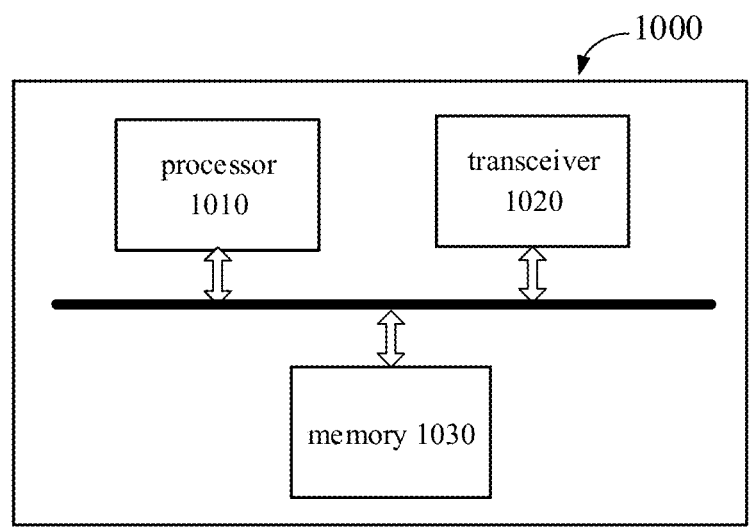
FIG. 10 is a schematic block diagram of a network device according to another embodiment of the present disclosure.

It should be noted that, in the embodiment of the present disclosure, the sending module 910 and the receiving module 920 can be implemented by a transceiver. As shown in FIG. 10, a network device 1000 can include a processor 1010, a transceiver 1020, and a memory 1030. The memory 1030 can be used to store codes executed by the processor 1010 to control the transceiver 1020 to perform corresponding functions.

The various components in the network device 1000 communicate with one another via internal connection paths to transfer control and/or data signals.

The network device 1000 shown in FIG. 10 or the network device 900 shown in FIG. 9 can implement the various processes implemented by the foregoing method embodiments. To avoid repetition, details are not described herein again.

Figure 11:
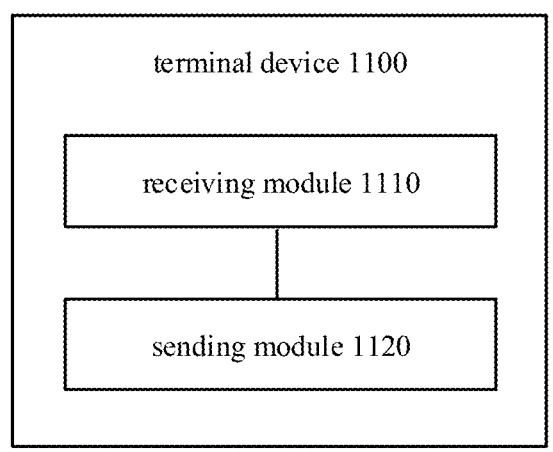
FIG. 11 is a schematic block diagram of a terminal device according to an embodiment of the present disclosure.

FIG. 11 shows a schematic block diagram of a terminal device 1100 according to an embodiment of the present disclosure. As shown in FIG. 11, the terminal device 1100 includes a receiving module 1110 and a sending module 1120.

The receiving module 1110 is configured to receive a downlink control channel sent by a network device on a first downlink frequency domain control area, wherein the downlink control channel includes first configuration information, and the first configuration information is used to dynamically indicate at least one first uplink frequency domain control area used by the terminal device to send uplink control channel to the network device.

The sending module 1120 is configured to send an uplink control channel to the network device on the first uplink frequency domain scheduling unit of each of the at least one first uplink frequency domain control area, wherein a frequency domain position of the first uplink frequency domain scheduling unit in the first uplink frequency domain control area is determined according to the first downlink frequency domain control area.

In the terminal device according to the embodiment of the present disclosure, the uplink frequency domain control area is indicated through first configuration information, and the position of the uplink frequency domain scheduling unit for transmitting the uplink control channel in the uplink frequency domain control area is determined from the position of the downlink frequency domain control area. Thus, the frequency domain resource for transmitting the uplink control channel can be determined in a manner combining dynamic scheduling and implicit indication. The device can reduce the scheduling complexity of the PUSCH, the signaling overhead, and the scheduling complexity of the network device.

Optionally, as an embodiment, the downlink control channel can further include second configuration information, wherein the second configuration information is used to indicate at least one first uplink time domain scheduling unit, and the sending module 1120 is specifically configured to send an uplink control channel to the network device on the first uplink frequency domain scheduling unit in the corresponding first uplink frequency domain control area of the at least one first uplink time domain scheduling unit.

Optionally, as an embodiment, the receiving module 1110 is specifically configured to receive a downlink control channel sent by a network device on a first downlink frequency domain control area of a first downlink time domain scheduling unit; wherein the second configuration information includes information about an offset of each first uplink frequency domain control area in the at least one first uplink time domain scheduling unit with respect to the first downlink time domain scheduling unit.

Optionally, as an embodiment, a position of the first uplink frequency domain scheduling unit in each of the first uplink frequency domain control areas may be determined according to a frequency domain position of the first downlink frequency domain control area in the first downlink time domain scheduling unit.

Optionally, as an embodiment, the second configuration information is used to indicate N first uplink time domain scheduling units, and the first configuration information can be used to indicate N first uplink frequency domain control areas, wherein each of the first uplink frequency domain control areas is located in one of the first uplink time domain scheduling units, any two first uplink frequency domain control areas are located in different first uplink time domain scheduling units, and the frequency domain positions of any two first uplink frequency domain control areas in the corresponding first uplink time domain scheduling units are the same.

Optionally, as an embodiment, the receiving module 1110 is further configured to receive third configuration information sent by the network device, wherein the third configuration information is used to indicate information for determining a starting frequency domain position of the first uplink frequency domain scheduling unit of each of the at least one first uplink frequency domain control area in each of the at least one first uplink frequency domain control area.

Optionally, in an embodiment of the present disclosure, the receiving module 1110 is specifically configured to receive the third configuration information sent by the network device through high layer signaling, the downlink control channel, a broadcast channel, or a system information block SIB.

Optionally, as an embodiment, the receiving module 1110 is further configured to receive fourth configuration information sent by the network device, wherein the fourth configuration information is used to indicate a frequency domain range that the terminal device can use, and the at least one first uplink frequency domain control area is an uplink frequency domain control area within the frequency domain range.

Optionally, in an embodiment of the present disclosure, the receiving module 1110 is specifically configured to receive the fourth configuration information sent by the network device through high layer signaling, the downlink control channel, a broadcast channel, or a system information block SIB.

Figure 12:
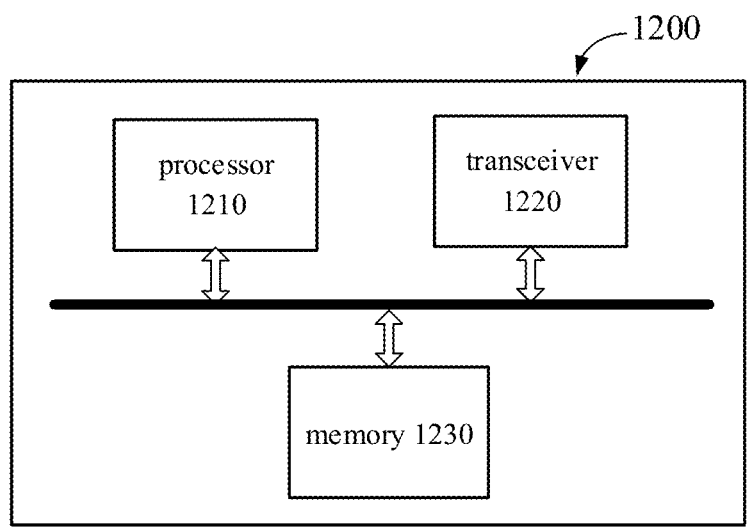
FIG. 12 is a schematic block diagram of a terminal device according to another embodiment of the present disclosure.

It should be noted that, in the embodiment of the present disclosure, the receiving module 1110 and the sending module 1120 can be implemented by a transceiver. As shown in FIG. 12, the terminal device 1200 can include a processor 1210, a transceiver 1220, and a memory 1230. The memory 1230 can be used to store codes executed by the processor 1210 to control the transceiver 1220 to perform corresponding functions.

The various components in the terminal device 1200 communicate with one another via internal connection paths to transfer control and/or data signals.

The terminal device 1200 shown in FIG. 12 or the terminal device 1100 shown in FIG. 11 can implement various processes implemented by the foregoing method embodiments. To avoid repetition, details are not described herein again.

It should be noted that the above various method embodiments of the present disclosure can be applied to a processor or implemented by a processor. The processor can be an integrated circuit chip with signal processing capabilities. In the implementation process, each step of the foregoing method embodiment can be completed by an integrated logic circuit of hardware in a processor or instructions in a form of software. The processor can be a general-purpose processor, a digital signal processor (DSP), an application specific integrated circuit (ASIC), a Field Programmable Gate Array (FPGA), or other programmable logic devices, discrete gates or transistor logic devices, discrete hardware components. The methods, steps, and logical block diagrams disclosed in the embodiments of the present disclosure can be implemented or carried out. The general purpose processor can be a microprocessor or the processor can be any conventional processor or the like. The steps of the method disclosed in the embodiments of the present disclosure can be directly implemented by the hardware decoding processor, or can be performed by a combination of hardware and software modules in the decoding processor. The software module can be located in a conventional storage medium such as random access memory, a flash memory, a read only memory, a programmable read only memory or an electrically erasable programmable memory, a register, and the like. The storage medium is located in the memory, and the processor reads the information in the memory and completes the steps of the above method in cooperation with the hardware.

It is to be understood that the memory in the embodiments of the present disclosure can be a volatile memory or a non-volatile memory, or can include both volatile and non-volatile memory. The non-volatile memory can be a read-only memory (ROM), a programmable read only memory (PROM), an erasable programmable read only memory (Erasable PROM, EPROM), or an electrically erasable programmable read only memory (Electrically EPROM, EEPROM) or a flash memory. The volatile memory can be a Random Access Memory (RAM) that acts as an external cache. By way of example and not limitation, many forms of RAM are available, such as a static random access memory (SRAM), a dynamic random access memory (DRAM), a synchronous dynamic random access memory (Synchronous DRAM, SDRAM), a Double Data Rate SDRAM (DDR SDRAM), an Enhanced Synchronous Dynamic Random Access Memory (Enhanced SDRAM, ESDRAM), a Synchronous Connection Dynamic Random Access Memory (Synchlink DRAM, SLDRAM) and a direct memory bus random access memory (DR RAM). It should be noted that the memories of the systems and methods described herein are intended to include, without being limited to, these and any other suitable types of memories.

It is to be understood that the first, second, third, fourth, and various reference numerals of the present disclosure are not intended to limit the scope of the embodiments of the present disclosure.

It should be understood that in the embodiment of the present disclosure, "B corresponding to A" means that B is associated with A, and B can be determined according to A. However, it should also be understood that determining B from A does not mean that B is only determined based on A, and that B can also be determined based on A and/or other information.

Additionally, the terms "system" and "network" are used interchangeably herein. The term "and/or" in this context is merely an association describing the associated objects, indicating that there can be three relationships, for example, A and/or B, which can indicate that three situations: only A, both A and B, and only B. In addition, the character "/" herein generally indicates that the contextual objects is an "or" relationship.

Those of ordinary skill in the art will appreciate that the elements and algorithm steps of the various examples described in connection with the embodiments disclosed herein can be implemented in electronic hardware or a combination of computer software and electronic hardware. Whether these functions are performed in hardware or software depends on the specific application and design constraints of the solution. A person skilled in the art can use different methods to implement the described functions for each particular application, but such implementation should not be considered to be beyond the scope of the present application.

A person skilled in the art can clearly understand that for the convenience and brevity of the description, the specific working process of the system, the device and the unit described above can refer to the corresponding process in the foregoing method embodiment, and details are not described herein again.

In the several embodiments provided by the present application, it should be understood that the disclosed systems, devices, and methods can be implemented in other manners. For example, the device embodiments described above are merely illustrative. For example, the division of the units is only a logical function division. In actual implementations, there can be another division manner, for example, multiple units or components can be combined or can be integrated into another system, or some features can be ignored or skipped. In addition, the mutual coupling or direct coupling or communication connection shown or discussed can be an indirect coupling or communication connection through some interfaces, device or units, and can be in an electrical, mechanical or other form.

The units described as separate components can or cannot be physically separated, and the components displayed as units can or cannot be physical units, that is, can be located in one place, or can be distributed to multiple network units. Some or all of the units can be selected according to actual needs to achieve the objective of the solution of the embodiments.

In addition, each functional unit in each embodiment of the present application can be integrated into one processing unit, or each unit can exist physically and separately, or two or more units can be integrated into one unit.

The functions can be stored in a computer readable storage medium if implemented in the form of a software functional unit and sold or used as a standalone product. Based on such understanding, the essence or the part of the technical solutions of the present application which contributes over the prior art can be embodied in the form of a software product, which is stored in a storage medium, including instructions used to cause a computer device (which can be a personal computer, a server, or a network device, etc.) to perform all or part of the steps of the methods described in various embodiments of the present application.

The foregoing is only exemplary embodiments of the present application, but the scope of protection of the present application is not limited thereto, and any person skilled in the art can easily think of modifications or substitutions within the technical scope disclosed in the present application, all of which should be covered by the scope of protection of this application. Therefore, the scope of protection of this application should be determined by the scope of protection of the claims.

What is claimed is:

1. A method for transmitting an uplink control channel, comprising:

sending, by a network device, a Physical Downlink Control CHannel (PDCCH) to a terminal device on a first downlink frequency domain control area of a first downlink slot, wherein the PDCCH comprises first configuration information and second configuration information, the first configuration information is used to dynamically indicate at least one first uplink frequency domain control area used by the terminal device to send an uplink control channel to the network device, and the second configuration information comprises information about an offset of each first uplink frequency domain control area in at least one first uplink slot with respect to the first downlink slot, and one of the at least one first uplink frequency domain control area comprises multiple first uplink frequency domain scheduling units;

sending, by the network device, third configuration information through system information block (SIB), wherein the third configuration information comprises the number of downlink frequency domain control areas in a second downlink slot, and the second downlink slot is before the first downlink slot in which the PDCCH is sent; and receiving, by the network device, an uplink control channel sent by the terminal device on a first uplink frequency domain scheduling unit in a corresponding first uplink frequency domain control area of the at least one first uplink slot, wherein a frequency domain position of the first uplink frequency domain scheduling unit in the corresponding first uplink frequency domain control area is determined according to a frequency domain position of the first downlink frequency domain control area in the first downlink slot and the number of the downlink frequency domain control areas in the second downlink slot.

2. The method according to claim 1, wherein the frequency domain position of the first uplink frequency domain scheduling unit in the first uplink frequency domain control area is determined according to the frequency domain position of the first downlink frequency domain control area in the first downlink slot from a mapping relationship between downlink frequency domain control areas and uplink frequency domain scheduling units.

3. The method according to claim 2, wherein the mapping relationship represents an association between indexes of the downlink frequency domain control areas and indexes of the uplink frequency domain scheduling units.

4. A method for transmitting an uplink control channel, comprising:
  receiving, by a terminal device, a Physical Downlink Control CHannel (PDCCH) sent by a network device on a first downlink frequency domain control area of a first downlink slot, wherein the PDCCH comprises first configuration information and second configuration information, the first configuration information is used to dynamically indicate at least one first uplink frequency domain control area used by the terminal device to send an uplink control channel to the network device, and the second configuration information comprises information about an offset of each first uplink frequency domain control area in at least one first uplink slot with respect to the first downlink slot, and one of the at least one first uplink frequency domain control area comprises multiple first uplink frequency domain scheduling units;
  receiving, by the terminal device, third configuration information through system information block (SIB), wherein the third configuration information comprises a number of downlink frequency domain control areas in a second downlink slot, and the second downlink slot is before the first downlink slot in which the PDCCH is sent; and
  sending, by the terminal device, an uplink control channel to the network device on a first uplink frequency domain scheduling unit in a corresponding first uplink frequency domain control area of the at least one first uplink slot, wherein a frequency domain position of the first uplink frequency domain scheduling unit in the corresponding first uplink frequency domain control area is determined according to a frequency domain position of the first downlink frequency domain control area in the first downlink slot and the number of the downlink frequency domain control areas in the second downlink slot.

5. The method according to claim 4, wherein the second configuration information is used to indicate N first uplink slots, the first configuration information is used to indicate N first uplink frequency domain control areas, each of the first uplink frequency domain control areas is located in one of the first uplink slots, and any two first uplink frequency domain control areas are located in different first uplink slots.

6. The method according to claim 4, further comprising:
  receiving, by the terminal device, fourth configuration information sent by the network device, wherein the fourth configuration information is used to indicate a frequency domain range that the terminal device can use, and the at least one first uplink frequency domain control area is an uplink frequency domain control area within the frequency domain range.

7. The method according to claim 6, wherein receiving, by the terminal device, fourth configuration information sent by the network device comprises:

receiving, by the terminal device, the fourth configuration information sent by the network device through high layer signaling, the downlink control channel, a broadcast channel, or a system information block SIB.

8. The method according to claim 4, wherein the frequency domain position of the first uplink frequency domain scheduling unit in the first uplink frequency domain control area is determined according to the frequency domain position of the first downlink frequency domain control area in the first downlink slot from a mapping relationship between downlink frequency domain control areas and uplink frequency domain scheduling units.

9. The method according to claim 8, wherein the mapping relationship represents an association between indexes of the downlink frequency domain control areas and indexes of the uplink frequency domain scheduling units.

10. A network device, comprising:
  a processor;
  a memory storing instructions executed by the processor; and
  a transceiver, wherein the processor executes the instructions to cause the transceiver to:
    send a Physical Downlink Control CHannel (PDCCH) to a terminal device on a first downlink frequency domain control area of a first downlink slot, wherein the PDCCH comprises first configuration information and second configuration information, the first configuration information is used to dynamically indicate at least one first uplink frequency domain control area used by the terminal device to send an uplink control channel to the network device, and the second configuration information comprises information about an offset of each first uplink frequency domain control area in at least one first uplink slot with respect to the first downlink slot, one of the at least one first uplink frequency domain control area comprises multiple first uplink frequency domain scheduling units;
    send third configuration information through system information block (SIB), wherein the third configuration information comprises a number of downlink frequency domain control areas in a second downlink slot, and the second downlink slot is before the first downlink slot in which the PDCCH is sent; and
    receive an uplink control channel sent by the terminal device on a first uplink frequency domain scheduling unit in a corresponding first uplink frequency domain control area of the at least one first uplink slot, wherein a frequency domain position of the first uplink frequency domain scheduling unit in the corresponding first uplink frequency domain control area is determined according to a frequency domain position of the first downlink frequency domain control area in the first downlink slot and the number of the downlink frequency domain control areas in the second downlink slot.

11. The network device according to claim 10, wherein the transceiver is further configured to send fourth configuration information to the terminal device, the fourth configuration information is used to indicate a frequency domain range that the terminal device can use, and the at least one first uplink frequency domain control area is an uplink frequency domain control area within the frequency domain range.

12. The network device according to claim 11, wherein the transceiver is specifically configured to:

send the fourth configuration to the terminal device through high layer signaling, the downlink control channel, a broadcast channel, or a system information block SIB.

13. The network device according to claim 10, wherein the frequency domain position of the first uplink frequency domain scheduling unit in the first uplink frequency domain control area is determined according to the frequency domain position of the first downlink frequency domain control area in the first downlink slot from a mapping relationship between downlink frequency domain control areas and uplink frequency domain scheduling units.

14. The network device according to claim 13, wherein the mapping relationship represents an association between indexes of the downlink frequency domain control areas and indexes of the uplink frequency domain scheduling units.

15. A terminal device, comprising:
a processor;
a memory storing instructions executed by the processor; and
a transceiver, wherein the processor executes the instructions to cause the transceiver to:
receive a Physical Downlink Control CHannel (PDCCH) sent by a network device on a first downlink frequency domain control area of a first downlink slot, wherein the PDCCH comprises first configuration information and second configuration information, the first configuration information is used to dynamically indicate at least one first uplink frequency domain control area used by the terminal device to send an uplink control channel to the network device, and the second configuration information comprises information about an offset of each first uplink frequency domain control area in at least one first uplink slot with respect to the first downlink slot, and one of the at least one first uplink frequency domain control area comprises multiple first uplink frequency domain scheduling units;
receive third configuration information through system information block (SIB), wherein the third configuration information comprises a number of downlink frequency domain control areas in a second downlink slot, and the second downlink slot is before the first downlink slot in which the PDCCH is sent; and
send an uplink control channel to the network device on a first uplink frequency domain scheduling unit in a corresponding first uplink frequency domain control area of the at least one first uplink slot, wherein a frequency domain position of the first uplink frequency domain scheduling unit in the corresponding first uplink frequency domain control area is determined according to a frequency domain position of the first downlink frequency domain control area in the first downlink slot and the number of the downlink frequency domain control areas in the second downlink slot.

16. The terminal device according to claim 15, wherein the second configuration information is used to indicate N first uplink slots, the first configuration information is used to indicate N first uplink frequency domain control areas, each of the first uplink frequency domain control areas is located in one of the first uplink slots, and any two first uplink frequency domain control areas are located in different first uplink slots.

17. The terminal device according to claim 15, wherein the transceiver is further configured to receive fourth configuration information sent by the network device, the fourth configuration information is used to indicate a frequency domain range that the terminal device can use, and the at least one first uplink frequency domain control area is an uplink frequency domain control area within the frequency domain range.

18. The terminal device according to claim 17, wherein the transceiver is specifically configured to:
receive the fourth configuration information sent by the network device through high layer signaling, the downlink control channel, a broadcast channel, or a system information block SIB.

19. The terminal device according to claim 15, wherein the frequency domain position of the first uplink frequency domain scheduling unit in the first uplink frequency domain control area is determined according to the frequency domain position of the first downlink frequency domain control area in the first downlink slot from a mapping relationship between downlink frequency domain control areas and uplink frequency domain scheduling units.

20. The terminal device according to claim 19, wherein the mapping relationship represents an association between indexes of the downlink frequency domain control areas and indexes of the uplink frequency domain scheduling units.

* * * * *

UNITED STATES PATENT AND TRADEMARK OFFICE
CERTIFICATE OF CORRECTION

| | | |
|---|---|---|
| PATENT NO. | : 11,683,802 B2 | |
| APPLICATION NO. | : 16/474544 | |
| DATED | : June 20, 2023 | |
| INVENTOR(S) | : Yanan Lin and Hua Xu | |

It is certified that error appears in the above-identified patent and that said Letters Patent is hereby corrected as shown below:

On the Title Page

Item (73) "Assignee," should read:
--GUANGDONG OPPO MOBILE TELECOMMUNICATIONS CORP., LTD.--.

Signed and Sealed this
Tenth Day of October, 2023

Katherine Kelly Vidal
*Director of the United States Patent and Trademark Office*